US007799278B2

(12) United States Patent
Salamitou et al.

(10) Patent No.: US 7,799,278 B2
(45) Date of Patent: Sep. 21, 2010

(54) MICROFLUIDIC SYSTEM FOR CHEMICAL ANALYSIS

(75) Inventors: Philippe Salamitou, Paris (FR); Joyce Wong, Pasadena, CA (US); Bhavani Raghuraman, Wilton, CT (US); Jagdish Shah, Wallingford, CT (US); Ronald E. G. Van Hal, Ridgefield, CT (US); Robert J. Schroeder, Newtown, CT (US); Patrick Jean René Tabeling, L'Hay Roses (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 1436 days.

(21) Appl. No.: 10/885,471

(22) Filed: Jul. 6, 2004

(65) Prior Publication Data

US 2006/0008382 A1 Jan. 12, 2006

(51) Int. Cl.
*G01N 21/00* (2006.01)

(52) U.S. Cl. .......................... 422/100; 422/57; 422/55; 422/50; 422/99; 436/165; 436/164

(58) Field of Classification Search ................ 422/100, 422/99, 57, 55, 50; 435/6; 310/358; 210/605, 210/638; 264/1.24; 436/164, 165
See application file for complete search history.

(56) References Cited

U.S. PATENT DOCUMENTS 5,116,759 A 5/1992 Klainer et al. .............. 435/288
5,300,228 A * 4/1994 Sugaya et al. ............... 210/638
5,645,725 A * 7/1997 Zitzelsberger et al. ...... 210/605
5,984,023 A 11/1999 Sharma et al. ................ 175/50
6,039,897 A * 3/2000 Lochhead et al. .......... 264/1.24
6,074,827 A * 6/2000 Nelson et al. .................. 435/6
6,262,519 B1 * 7/2001 Furlani et al. ............... 310/358
6,306,590 B1 * 10/2001 Mehta et al. ................... 435/6
2002/0164816 A1 * 11/2002 Quake ........................ 436/161

(Continued)

FOREIGN PATENT DOCUMENTS

DE 19941271 A1 4/2001

(Continued)

OTHER PUBLICATIONS

Tsai, Jr-Hung et al, Active microfluidic mixer and gas bubble filter driven by thermal bubble micropump, 2002, Sensors and Actuators A, 97-98, 665-671.*

(Continued)

*Primary Examiner*—Walter D Griffin
*Assistant Examiner*—Christine T Mui
(74) *Attorney, Agent, or Firm*—James McAleenan; Vincent Loccisano; Brigid Laffey

(57) ABSTRACT

A microfluidic system for performing fluid analysis is described having: (a) a submersible housing having a fluid analysis means and a power supply to provide power to said system; and (b) a substrate for receiving a fluid sample, having embedded therein a fluid sample inlet, a reagent inlet, a fluid sample outlet, and a mixing region in fluid communication with the fluid sample inlet, the reagent inlet, and the fluid sample outlet, and wherein the substrate includes a fluid drive means for moving the fluid sample through the substrate, and wherein the substrate interconnects with the housing. At least a portion of the fluid analysis means may be embedded in the substrate.

39 Claims, 8 Drawing Sheets

U.S. PATENT DOCUMENTS

| | | | | |
|---|---|---|---|---|
| 2002/0187074 | A1 | 12/2002 | O'Connor et al. | 422/82.05 |
| 2003/0106799 | A1 | 6/2003 | Covington et al. | 204/600 |
| 2003/0150791 | A1 | 8/2003 | Cho et al. | 210/321.84 |
| 2004/0129874 | A1 * | 7/2004 | Torgersen et al. | 250/255 |

FOREIGN PATENT DOCUMENTS

| | | | |
|---|---|---|---|
| JP | 2003190768 | A | 7/2003 |
| WO | WO 00/20117 | A2 | 4/2000 |
| WO | WO 00/20117 | A3 | 4/2000 |
| WO | 02/077613 | A2 | 10/2002 |
| WO | 2004/087283 | A1 | 10/2004 |

OTHER PUBLICATIONS

Combined Search and Examination Report Under Sections 17 and 18(3) from the United Kingdom Patent Office for Application GB0518160.7, date of search Nov. 30, 2005.

Manz et al. Miniaturized Total Chemical and Analysis Systems: A Novel Concept for Chemical Sensing, *Sensors and Actuators B*, vol. B1 (1990) pp. 244-248.

Ocean Optics, Fiber Optic pH Sensors *Product Catalog on Spectrometers and Accessories* (2004) p. 58.

Ruzicka et al. Flow Injection Analysis. *Chemical Analysis—A Series of Monographs on Analytical Chemistry and its Applications.* John Wiley (1981) Chapters 1 and 2.

Strook et al. Chaotic Mixer for Microchannels. *Science*. (2002) vol. 295, pp. 647-651.

Verpoorte et al. Microfluidics Meets MEMS *Proceedings of the IEEE*. (Jun. 2003) vol. 91, No. 6. pp. 930-953.

Vogel, A. I. Text-Book of Quantitative Inorganic Analysis, 3rd Edition. *John Wiley and Sons, Inc.* (1961) Chapter 10-12.

* cited by examiner

MICROFLUIDIC SYSTEM FOR CHEMICAL ANALYSIS

FIELD OF THE INVENTION

The present invention relates to a chemical analysis system and, more particularly, to the use of self-supporting microfluidic systems for chemical analysis of water or mixtures of water and oil.

BACKGROUND

In oil well evaluation and aquifer management, quantitative analyses of formation fluid are typically performed in a laboratory environment, the samples having been collected remotely. Standard laboratory procedures are available for quantitative analyses by adding a reagent to chemically react with a specific target species in a sample to cause detectible changes in fluid property such as color, absorption spectra, turbidity, electrical conductivity, etc. See Vogel, A. I., "Text-Book of Quantitative Inorganic Analysis, 3rd Edition", Chapter 10-12, John Wiley, 1961, incorporated by reference herein in its entirety. Such changes in fluid property may be caused, for example, by the formation of a product that absorbs light at a certain wavelength, or by the formation of an insoluble product that causes turbidity, or bubbles out as gas. For example, addition of pH sensitive dyes is used for colorimetric pH determination of water samples. A standard procedure for barium determination requires addition of sodium sulfate reagent to the fluid sample resulting in a sulfate precipitate that can be detected through turbidity measurements. Some of these standard laboratory procedures have been adapted for flow injection analysis (Ruzicka et al., Flow Injection Analysis, Chapters 1 and 2, John Wiley, 1981, incorporated by reference herein in its entirety). Flow injection analysis "is based on the injection of a liquid sample into a moving non-segmented continuous carrier stream of a suitable liquid" (see Ruzicka et al., Chapter 2, page 6).

Fluid samples collected downhole can undergo various reversible and irreversible phase transitions between the point of collection and the point of analysis as pressure and temperature conditions are hard to preserve. Concentrations of constituent species may change because of loss due to vaporization, precipitation etc., and hence the analysis as done in the laboratories may not be representative of true conditions. For example, water chemistry and pH are important for estimating scaling tendencies and corrosion; however, the pH can change substantially as the fluid flows to the surface. Likewise, scaling out of salts and loss of carbon dioxide and hydrogen sulfide can give misleading pH values when laboratory measurements are made on downhole-collected samples. Conventional methods and apparatuses require bulky components that are not efficiently miniaturized for downhole applications.

Further, fluid sample for water management requires very frequent (i.e. daily, twice daily, etc.) monitoring and measuring of fluid properties. These monitoring regimes include permanent subsurface systems that are designed solely to gather and store frequently acquired data over long periods of time. Accordingly, there is a need for a system that uses very low quantities of reagent, operates autonomously, and collects or neutralizes waste product. Traditional solutions include chemical sensors that tend to lose calibration over a relatively short period of time.

As will be described in more detail below, the present invention applies MEMS/MOEMS techniques to develop microfluidic devices overcoming the limitations of the prior art. Micro electromechanical systems (MEMS) are well known as microfluidic devices for chemical applications since the 1990's (see Manz et al., "Miniaturized Total Chemical and Analysis Systems: A Novel Concept for Chemical Sensing," *Sensors and Actuators B*, Vol. B1, pages 244-248 (1990), incorporated by reference herein in its entirety) and are typically fabricated from silicon, glass, quartz and poly (dimethylsiloxane) (PDMS) (see Verpoorte et al., "Microfluidics Meets MEMS" *Proceedings of the IEEE*, Vol. 91, pages 930-953 (June 2003), incorporated by reference herein in its entirety). MEMS technology allows for miniaturized designs requiring smaller liquid volumes. In addition, MEMS devices are easy to mass produce having a very accurate reproducibility. MEMS also allows easy integration of different components, such as valves, mixers, channels, etc. Similarly, MEMS systems with optical devices are called MOEMS (micro optical electro mechanical systems, or Optical MEMS). MOEMS have also been used for chemical applications since the 1990's. Commercial (non-chemical) structures are used in the telecommunications field to make use of MEMS wave-guides to modify or route an optical signal.

For example, U.S. Pat. No. 5,116,759 to Klainer et al. (incorporated by reference herein in its entirety) discloses a laboratory-based system utilizing a MEMS device. In particular, the MEMS device is a cell that receives the sample for analysis. All associated analytical devices, including optical interrogation, power supply, reagent sources, and processing means, are typical laboratory-sized devices not suitable for remote interrogation.

Accordingly, it is one object of the present invention to provide a novel system to autonomously perform remote chemical analysis.

It is another object of the present invention to provide a microsystems that will regulate the amounts of sample and reagent to be consumed during each measurement, allowing the use of a reagent reservoir in the downhole instrument and the storage of waste within the instrument.

It is yet another object of the present invention to provide a microsystem having a total flow rate in the order of microliters per minute, enabling the measurement of pH and use with other reagents for determining the concentration of species like nitrate, heavy metals, scaling ions and hydrocarbons.

It is yet a further object of the present invention to provide an autonomous system having low power consumption, minimum consumables, neutralized waste material and data logging for in-situ measurements of fluid parameters on a multi-year permanent basis.

SUMMARY OF THE INVENTION

In a first embodiment of the present invention, a microfluidic system for performing fluid analysis is disclosed having: (a) a submersible housing having a fluid analysis means and a power supply to provide power to the system; and (b) a substrate for receiving a fluid sample, having embedded therein a fluid sample inlet, a reagent inlet, a fluid sample outlet, and a mixing region in fluid communication with the fluid sample inlet, the reagent inlet, and the fluid sample outlet, and wherein the substrate includes a fluid drive means for moving the fluid sample through the substrate, and wherein the substrate interconnects with the housing. At least a portion of the fluid analysis means may be embedded in the substrate.

Fluid is moved through the system using a fluid drive means which may be passive or active. A passive fluid drive system includes a system wherein the fluid is driven due to the differential in pressure between the sampling environment and the internal pressure of the microfluidic device. Active fluid drive systems may include a pump in the housing or embedded in the substrate. Preferably, the pump is a piezo-electric pump embedded in the substrate; most preferably, it is pressure-balanced. At least one reagent reservoir may be connected to the reagent inlet to provide reagents to perform the fluid analysis. It is noted that the substrate may include more than one reagent inlet, wherein each additional inlet has at least one reagent reservoir. Preferably, the reagent reservoirs are collapsible bags, and, most preferably, they are threaded bags.

To fully pressure-balance the system and ensure efficient fluid handling, the fluid sample inlet and fluid sample outlet may be in fluid communication with the fluid to be sampled. In addition, a separator system may be positioned at the fluid sample outlet to remove particulate from the fluid prior to analysis. The separator system may be embedded in the substrate and may include activated charcoal, an ion exchange membrane, or other means commonly used in the field.

The system may further comprise a control means to control fluid analysis means to assist in the remote operation of the system. Likewise, data processing means may be used to receive, store, and/or process data from the fluid analysis means. The control means may include data transmission means to transmit data received from the fluid analysis means.

A second embodiment is a method of performing fluid analysis comprising: (a) remotely deploying a microfluidic system in or proximate to the fluid to be sampled (also referred to as a sampling environment), wherein the microfluidic system is comprised of a submersible housing having a fluid analysis means and a power supply to provide power to the system; and a substrate for receiving a fluid sample, having embedded therein a fluid sample inlet, a reagent inlet, a fluid sample outlet, and a mixing region in fluid communication with the fluid sample inlet, the reagent inlet, and the fluid sample outlet, and wherein the substrate includes a fluid drive means for moving the fluid sample through the substrate, and wherein the substrate interconnects with the housing; (b) receiving a fluid sample into the fluid sample inlet; (c) mixing the fluid sample with reagent from the reagent inlet in the mixing region; and (d) analyzing the fluid sample using the fluid analysis means. The fluid sample may then be stored in the housing for later disposal or discharged back, into the sampling environment.

The device of the present invention may be manufactured by (a) providing two or more substrates; (b) forming fluid mixing channels and fluid analysis channels within at least one of the substrates; (c) forming an inlet and an outlet within at least one of the substrates; (d) embedding a piezoelectric pump within at least one of the substrates; and (e) bonding the substrates to one another. It is preferred that the optical fibers and electrical wires required for the operation of the pump and the fluid analysis region be embedded within at least one of the substrates.

The overall system has limited dimensions (such as in diameter and length) and is completely self supporting, enabling remote analysis or monitoring such as in standpipes, aquifers, groundwater, hazardous sites, chemical plants and boreholes. The device is submersible and autonomous. Because the device remains robust over an extended period of time it may be permanently (or semi-permanently) installed in remote locations for extended monitoring.

The instrument is particularly useful, for example, in oilfield applications for the detection of scale forming ions and dissolved gases and in water applications for the detection of hazardous chemicals. Chemical measurements of interest in the water business include, but is not limited to, pH and toxic chemicals, such as nitrate, arsenic and other heavy metals, benzene and other organic compounds. Chemical measurements of interest in the oilfield include, but is not limited to, the determination of pH, the detection of $H_2S$ and $CO_2$, as well as scale forming ions such as Ca, Ba, Sr, Mg, and $SO_4$.

Further features and applications of the present invention will become more readily apparent from the figures and detailed description that follows.

DETAILED DESCRIPTION

Figure 1:
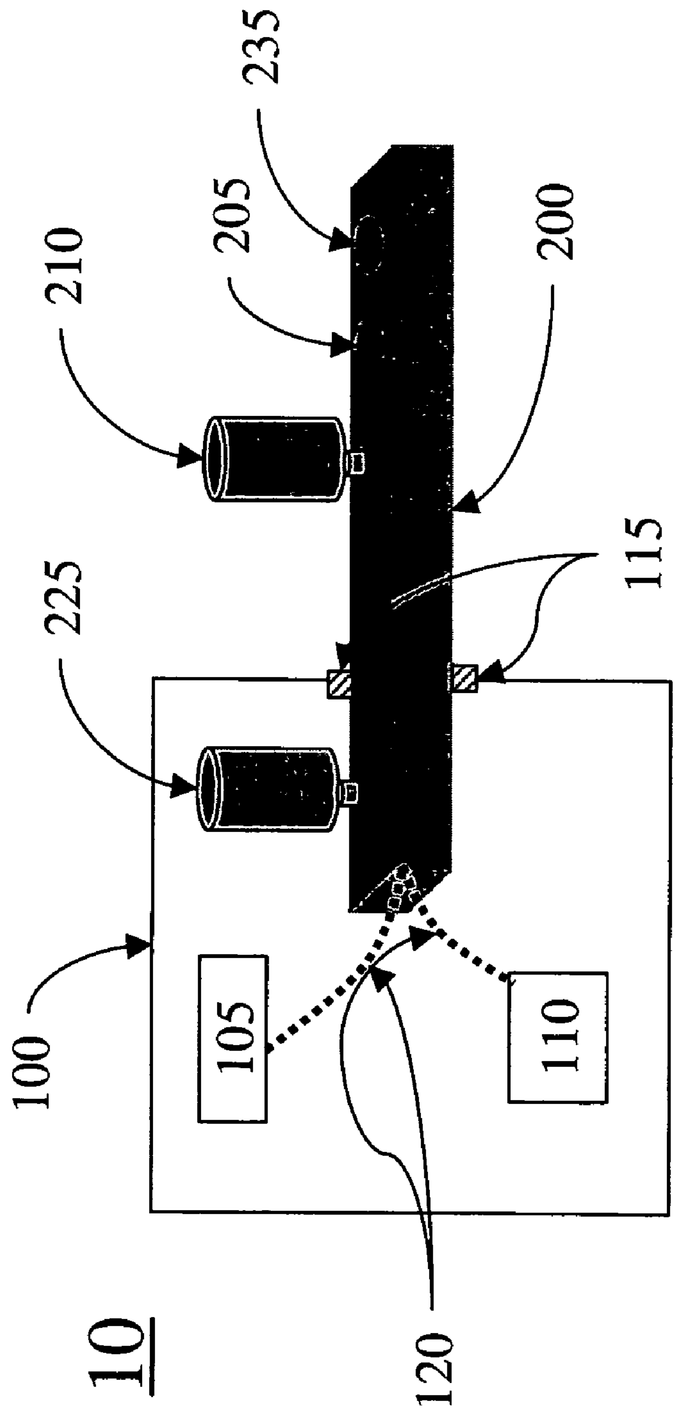
FIG. 1 is a schematic diagram of the microfluidic system of the present invention.

FIG. 1 is a schematic of the autonomous microfluidic system 10 of the present invention having a microfluidic substrate 200 in communication with a housing 100. Preferably, the substrate 200 is hermetically sealed to the housing 100 such that the sample inlet 205 extends outside of the housing 100 and the electrical connections 120 are within the housing 100. The housing 100 further includes a power supply 105 and control electronics 110 in electrical connection with the substrate 200. It is noted that while reservoir 210 is shown in this figure outside the housing 100 and the waste collector 225 is shown inside the housing 100, the location of these components relative to the housing will depend on the desired configuration of the system. Alternatively, the waste fluid may be discharged via outlet 235. Accordingly, the configuration of FIG. 1 is intended to be illustrative and non-limiting. Most preferably, the housing 100 is bonded 115 directly to the substrate 200 avoiding electrical feedthroughs.

Figure 2A:
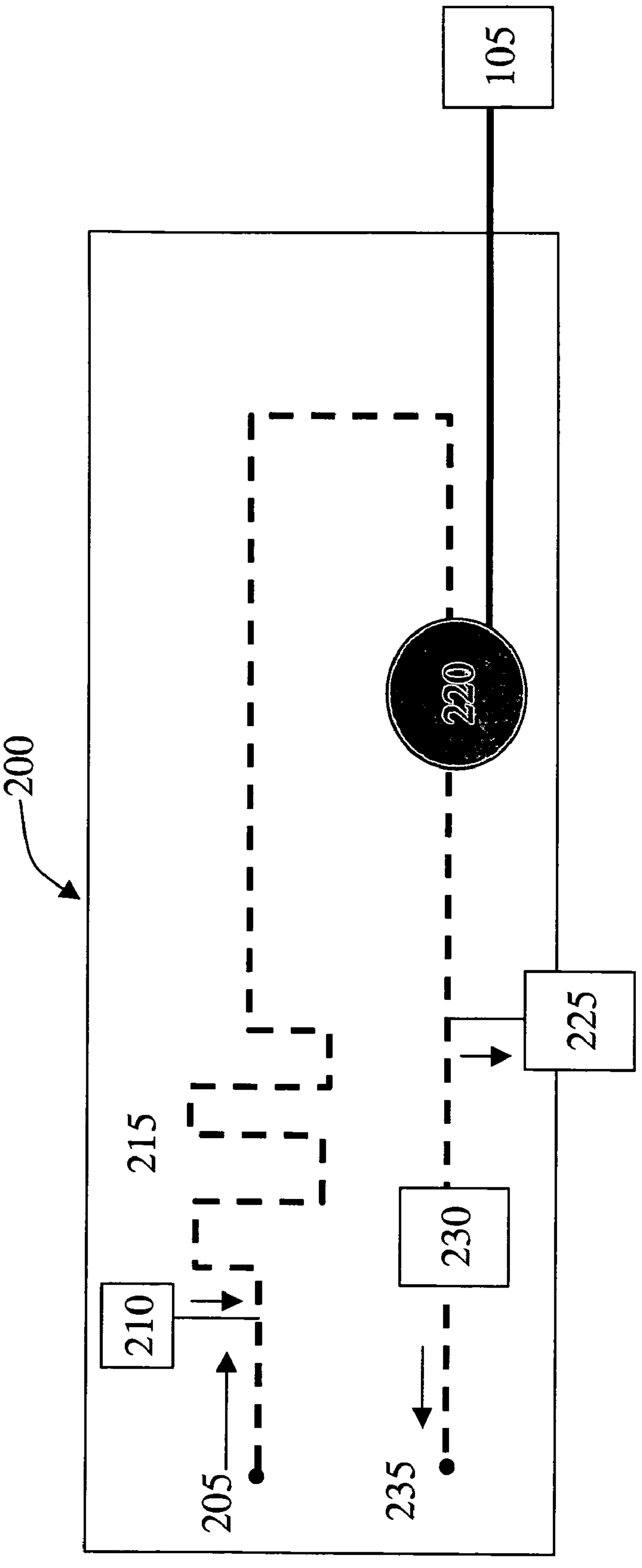
FIGS. 2(*a*), (*b*) and (*c*) are schematic diagrams of the substrate of the microfluidic system of the present invention.
Figure 2B:
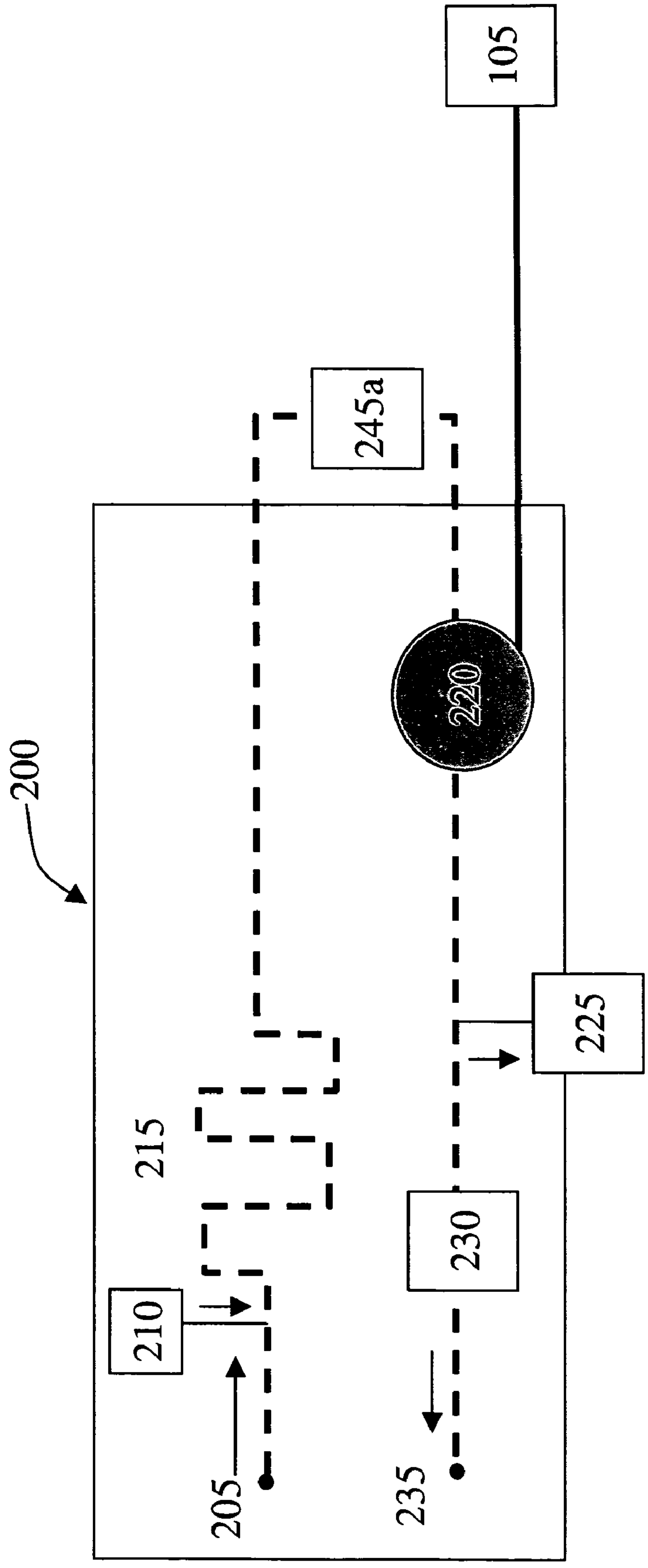
Figure 2C:
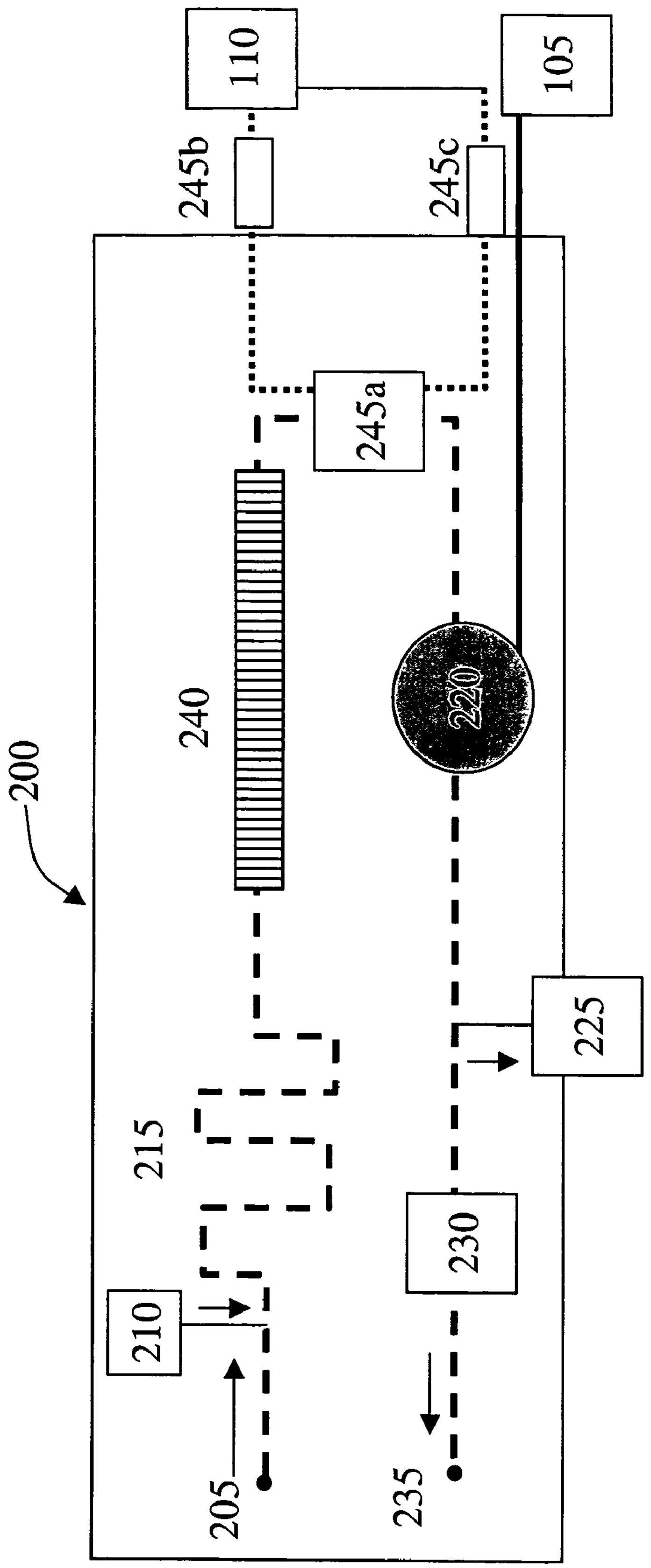

FIGS. 2(*a*)-(*c*) are detailed schematics showing non-limiting embodiments of the substrate 200. More particularly, FIG. 2(*a*) depicts the substrate 200 having fluid channels (dashed lines), optical fibers (dotted lines), and electrical wires (grey lines) embedded therein. Fluids enter the system via sample inlet 205 and mixes with reagent stored in the reagent reservoir 210 in mixing region 215. To minimize particulate in the system, a filter (not shown) may be placed over, attached to, or embedded in, the inlet. The fluid in the system is subject to a driving force, which may be passive or active. As shown in FIG. 1(*a*), the fluid may be moved through the system using a pump 220 (such as an ultrasonic pump or a piezo-electric pump) operated by control electronics 110 and a power source 105. Preferably, the pump is a piezo-electric pump that is pressure-balanced, such as by applying a water impervious, electrically isolating gel on the surface of the piezo. The system may be designed such that the pump pulls or pushes the fluid through the system, or designed such that the pump pulls a portion of the fluid and pushes another portion of the fluid. The arrows are intended to show the direction of fluid flow. Alternatively, fluid may be moved through the substrate using a passive fluid drive means wherein the differential in pressure between the sampling environment and the pressure within the tool housing is used to move the fluid through the system (such as by lowering the pressure within the submersible housing relative to the sampling environment).

The sample may be stored in a collector 225 for later use or disposal, or discharged back into the borehole via outlet 235. The sample may be 'cleaned' (i.e., reagents or precipitates removed to an acceptable level) prior to discharge using a separator means 230, having, for example, activated charcoal or an ion membrane. The separator means 230 may be embedded on the substrate or may be positioned to the outside of the outlet such that the sample passes through the separator means prior to discharge.

The reagent reservoir 210 preferably has a pressure-balanced contact with the environment to ensure that the reagent is subject to the same pressure as the sample. This pressure-balanced contact might be, for example, a flexible impermeable foil or a mechanical pressure adapter. The pressure equilibrium prevents back flow through the microfluidic device and reduces the pressure difference to be overcome by the pump. The reagent in the reservoir can be, for example, a pH-sensitive color indicator or other reagents or catalysts applicable to the chemical analyses desired. The reagent reservoir 210 is connected to the fluid handling system, such as through a permanently open connection or a controlled connection such as with a valve. It is noted that the overall system is inherently pressure-balanced as the inlet and the outlet are exposed to the sampling environment.

The system may be designed to control the flow rate, sample volumes, and mixing ratios by adjusting the fluid resistance of the system. Because the total flow rate is dependent on the fluid resistance of the complete circuitry, dimensional variation (shape and geometry of the channels, for example) in the system will influence the total fluid resistance and thus the flow rate. To ensure that adequate mixing of the sample with the reagent over a relatively short channel length, various mixing and channel geometries may be used. One useful geometry is the herringbone geometry as described by Strook et al. in "Chaotic Mixer for Microchannels", *Science*, Vol. 295, pages 647-651 (2002) (incorporated by reference herein in its entirety).

While only one reagent and mixing region are shown in FIG. 2(*a*), the fluid circuitry may be adapted to generate certain reaction time before interrogation. Accordingly, the fluid circuitry may contain multiple reagent reservoirs, fluid resistors and mixers to control fluid flow and mixing or to create subsequent reactions (such as multistage reactions with variable reaction times).

Figure 3:
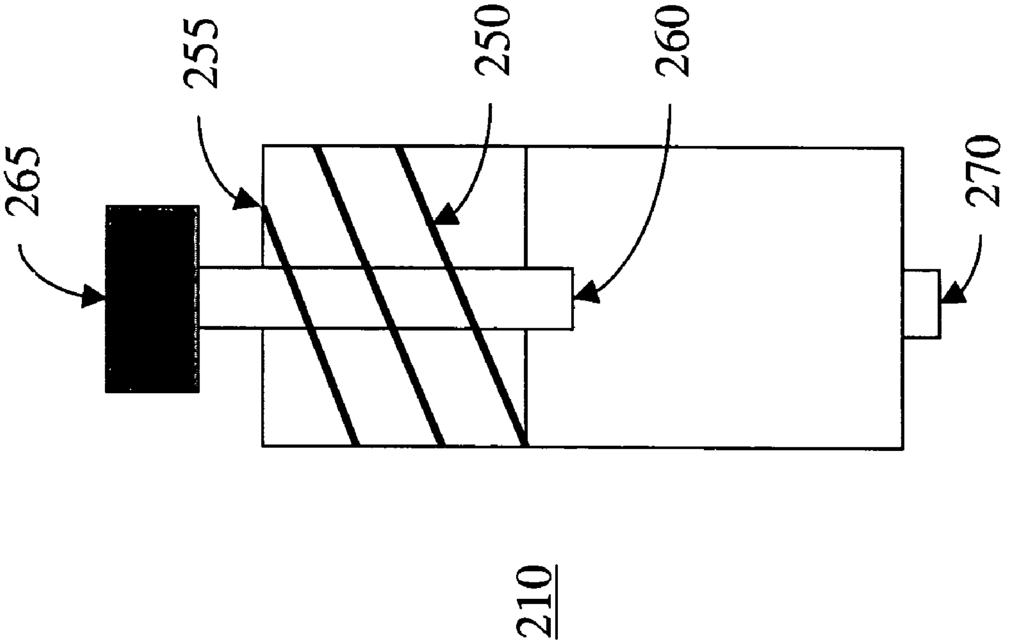
FIG. 3 is a schematic showing a detail of a reagent reservoir having a spiral channel.

FIGS. 2(*b*) and 2(*c*) show alternate embodiments of the present invention. FIG. 2(*b*) shows the microfluidic device of FIG. 2(*a*) with a fluid analyzing means 245 inside housing 100 (such as part of the analysis module of FIG. 5). Again, more than one reagent reservoir may be used (i.e., positioned in parallel or series) to allow more than one analyses to be performed using a single microfluidic system. Further, the reagents may be stored in a collapsible bag, or a threaded bag as shown in FIG. 3, to minimize backflow through the substrate. While this embodiment shows the fluid analysis means 245 in the housing 100 and connected to the substrate 200, the fluid analysis means 245 may be embedded directly into the substrate 200 (see, for example, FIG. 2(*c*)).

In FIG. 2(*c*) the fluid analyzing means 245 is an optical interrogation zone 245*a* having a light source 245*b* and a detector 245*c*. The light source 245*b* and detector 245*c* may be either embedded in the substrate or connected via optical fibers (as shown). The light source 245*b* transmits lights through the optical interrogation zone 245*a* to the detector 245*c*. The light source 245*b*, may be any incandescent lamp, LED, laser, etc. suitable for the analysis to be performed. Likewise, the detector 245*c* measures the transmitted light at a defined wavelength depending on the analysis performed and the source 245*b* used. For example, the detector 245*c* can be a spectrum analyzer or a combination of appropriate filters and photodiodes. Light source 245*b* and detector 245*c* are controlled by electronics 110, which may include a microprocessor to process the data and store the measurement values. It is noted that if cyclic olefin copolymer (COC) or any optically clear material is used as the substrate, then no separate optical windows are needed; COC may be used as the optical window.

As mentioned above, the reagent reservoir 210 should be pressure balanced with the sampling environment. FIG. 3 is a schematic of a most preferred embodiment of the reagent reservoir 210, hereinafter referred to as a threaded reagent reservoir. This embodiment includes a spiral channel 250 having an opening at the top at 255 such that the channel is pressure balanced relative to the sampling environment. A channel 260 extends through the threaded portion to allow the reagent reservoir to be filled and capped 265. Reagent passes from the reservoir into the channels of the substrate via outlet 270.

Alternatively, the fluid analyzing system may be designed to perform resistivity tests, determine the presence of specific precipitate (such as metal or salt precipitates) or perform other chemical analyses.

It is noted that fluid analyses may take place at more than one interrogation zone (not shown), placed in parallel or in series. As described above, multiple reagents may be used to allow for multiple analyses.

One particularly useful downhole fluid analysis is pH indication. The present invention was tested wherein the interrogation zone was a colorimetric (i.e. optical) pH indicator. The results of this test are provided in Table 1, wherein a sample with a known pH was measured using the present invention and compared to measurements taken with standard laboratory equipment (in this case a Spectroquant® Vega 400 photometer):

TABLE 1

| Certified Buffer pH | Measurement using Vega 400 | Measurement using the present invention |
|---|---|---|
| 4.00 | 3.98 | 3.97 |
| 5.00 | 4.90 | 5.01 |
| 6.00 | not taken | 5.98 |
| 6.86 | 6.78 | 6.84 |
| 7.00 | 6.90 | 6.97 |
| 7.70 | 7.63 | 7.67 |
| 8.00 | 7.99 | 7.97 |

As can be seen by the data of Table 1, the system of the present invention can take measurements that are comparable to standard laboratory measurements.

One skilled in the art would recognize that the presence of bubbles in the fluid sample may interfere with optical measurements and capillary pressure. Accordingly, a bubble trap 240 may be positioned between the mixing region 215 and the optical interrogation zone 245*a*. The entire system is preferably manufactured using MEMS/MOEMS techniques such that all or nearly all connections are eliminated. Accordingly, most bubble sources are naturally eliminated in the design. However, the bubble trap 240 may be used to remove any remaining bubbles and ensure the integrity of the optical measurements.

Figure 4:
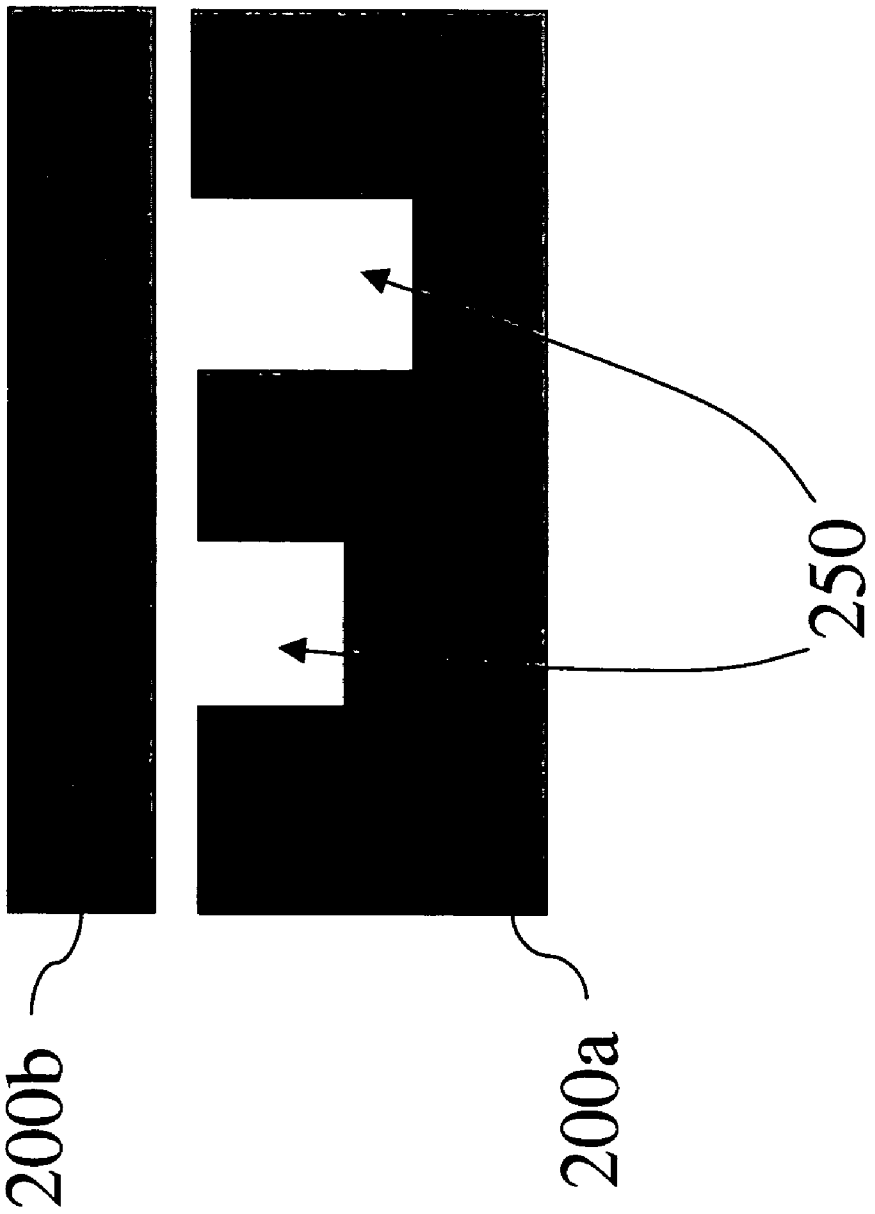
FIG. 4 is a schematic diagram showing one method of manufacturing the present invention.

The microfluidic device described herein is preferably designed and manufactured so that all channels, tubes and fibers are embedded in a single substrate, such as that possible using MEMS/MOEMS techniques. Suitable substrates include (but are not limited to) silicon, quartz, and plastic. For downhole applications, including oilfield and water management applications, the substrate may be constructed of plastic using micro-molding techniques wherein a mold is made by machining a piece of metal. The plastic is then formed using the mold and appropriately cured, if needed. As shown in FIG. 4, to close the channel 250 in substrate 200*a*, a second substrate 200*b* may be attached to 200*a* where a surface-to-surface bond is applied such that the channels 250 are preserved. Adhesive, such as UV curable adhesive, may be used. If UV curable adhesive is used, a mask may be used to selectively cure the glue in areas of interest. The mask allows preferential transmission of UV light such that the glue does not cure in the area of the channels, but cures where desired. In addition, laser welds may be used. Preferably, substrate is formed of plastic and chemical bonds are used which minimizes dimensional variations due to the layer of glue and complexity of laser welding.

It is noted that while only two substrate segments are shown in FIG. 4, additional substrate segments may be used to form the microfluidic device of the present invention.

Depending on the analysis to be performed, it may be preferable to achieve highly polished channel surfaces. For example, if the microfluidic device is to be used for optical interrogation, channel surfaces within the optical interrogation zone may require optical grade polishing to nano-meter scale. For plastic molding, this can be achieved by making the corresponding surface of the mold to be of optical quality polish.

All tubes and fibers should preferably extend from the substrate at a common end such that they may be isolated in a common waterproof housing. This configuration also allows the device to be easily adapted for fitting in various sampling tools, such as those typically used to monitor aquifers and groundwater as well as those used in the oilfield.

The present invention may be implemented in a laboratory or in various downhole fluid analysis tools. For example, the apparatus described in commonly owned co-pending U.S. patent application Ser. No. 10/667,639 filed Sep. 22, 2003, entitled "Determining Fluid Chemistry of Formation Fluid by Downhole Reagent Injection Spectral Analysis" (incorporated by reference herein in its entirety) is a preferred implementation of the present reagent mixture.

Figure 5:
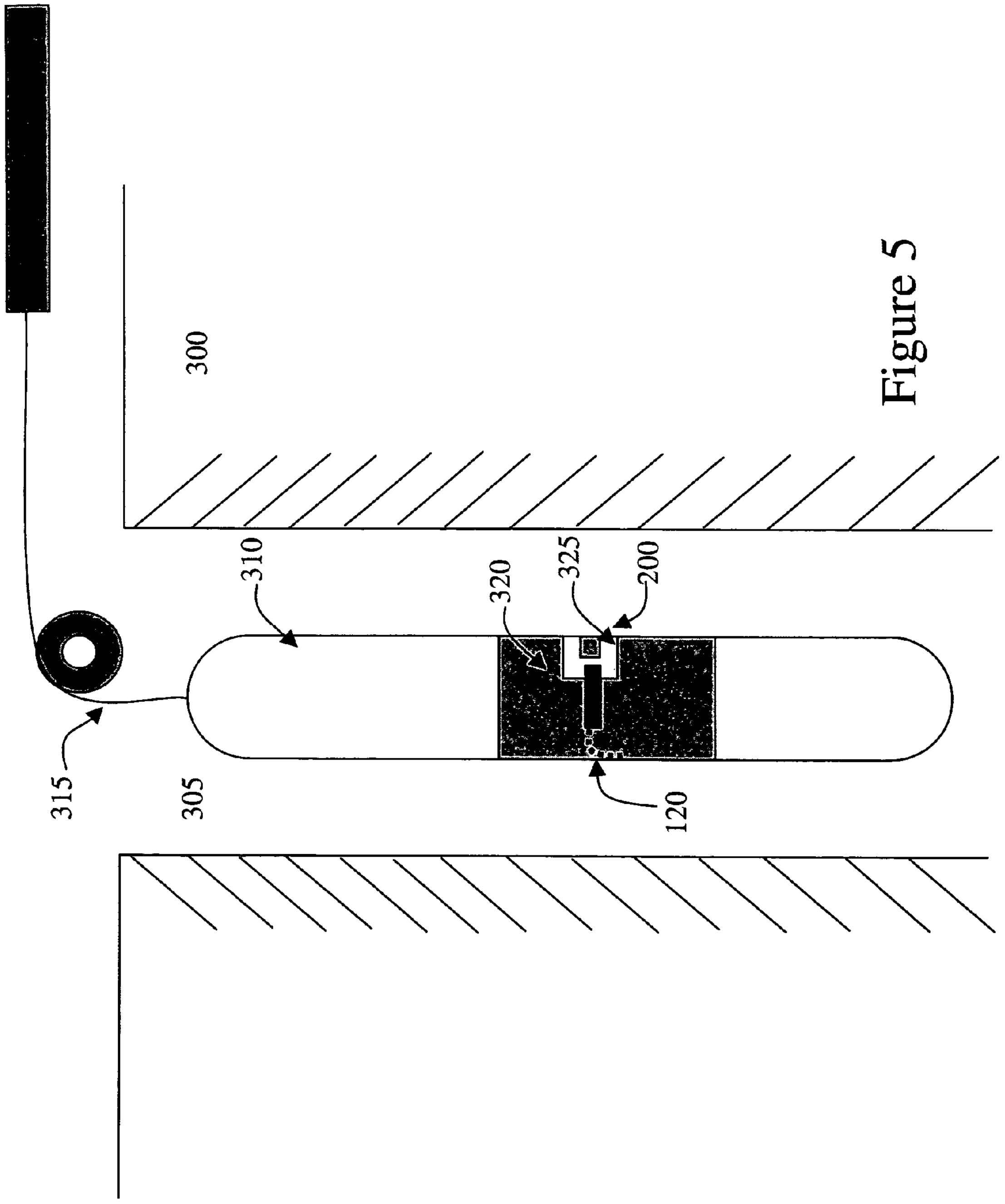
FIG. 5 is a schematic diagram of one application of the present invention, useful in the oilfield and water management areas.

One non-limiting embodiment of the present invention, as shown in FIG. 5, is a wireline formation tester 310, including fluids analyzer 320. The formation tester is shown downhole within fluid-filled borehole 305 in formation 300 suspended by logging cable 315. Logging cable 315 also couples the formation tester to surface system. The housing in this example is the formation tester 310 having a fluids analyzer module 320 with the substrate 200. As shown in this figure, the substrate 200 is affixed to the formation tester 310 in the area of the fluids analyzer module 320 such that the electrical connections 120 are isolated within the tool and the inlet of the microfluidic device (not shown) extends into a fluid flow line 325. The power supply and control electronics (not shown) are within the formation tester 310. This configuration eliminates the need to separate pumps, probes and reagent containers.

It is noted that FIG. 5 is intended to depict a non-limiting embodiment useful for deploying the present invention in the oilfield. Other suitable elements may be included as dependent upon the specific application. For example, other configurations may be used to extract fluids such as in water or waste water management. The substrate may be affixed to tools usually deployed in groundwater monitoring wells such as the Diver® by Van Essen Instruments, chemical processes plants, or producing wells. Likewise, the device may be permanently or semi-permanently installed in these environments.

Figure 6:
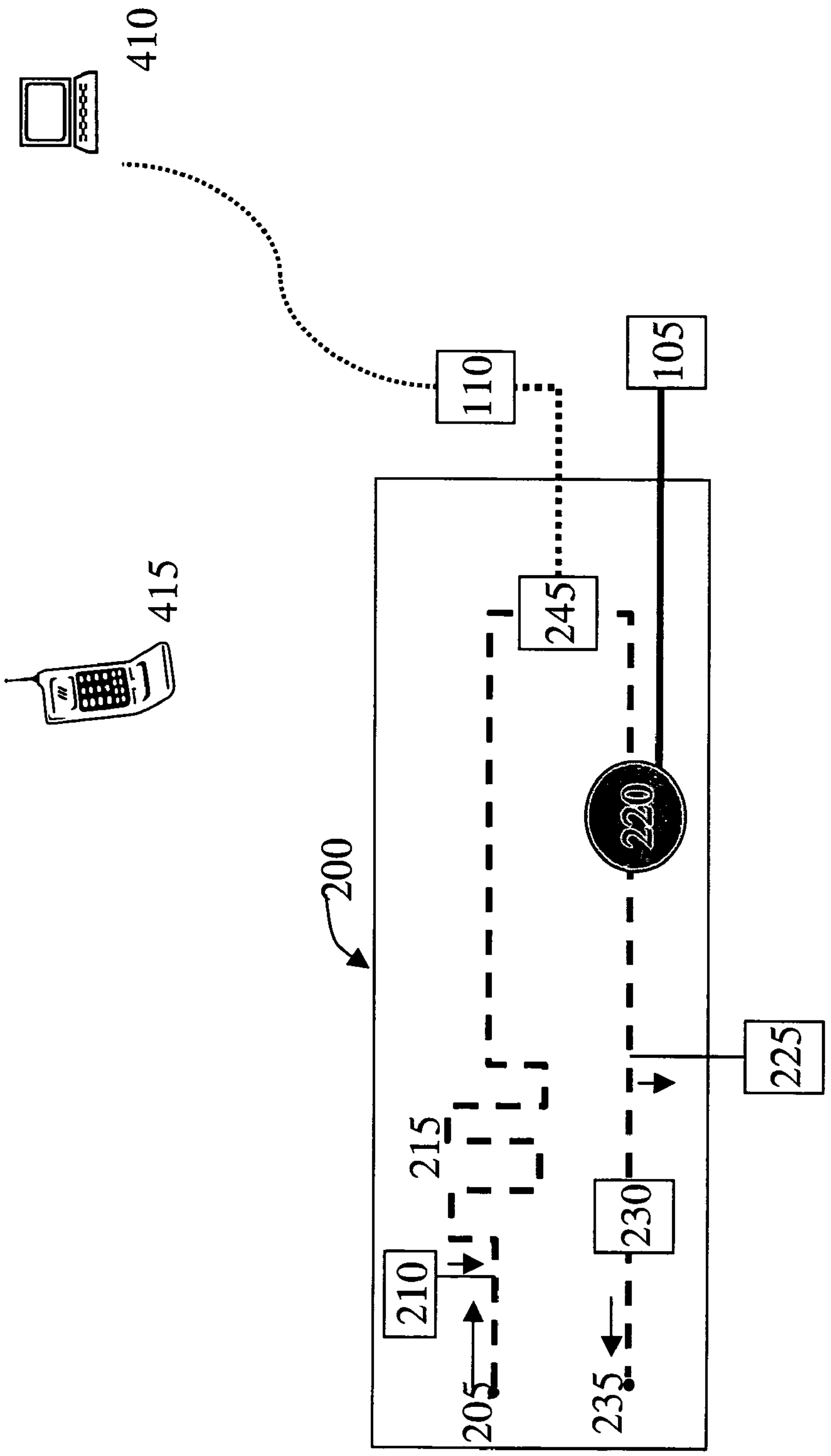
FIG. 6 is a schematic diagram showing various suitable telemetry methods.

It is envisioned that the microfluidic device can be used to perform fluid analysis on any fluid sample obtained remotely where space and sample volume is of concern. For example, the device may be used in processing plants, for space applications or in a downhole oilfield or water management applications. In addition, the microfluidic system of the present invention is robust for long term, semi-permanent and permanent applications (on the order of days, months, and years). Accordingly, as shown in FIG. 6, the microfluidic device 100 may communicate with remote equipment via one of the many telemetry schemes known in the art, such as over electronic conductors, optical fibers or other suitable medium to a computer or other remote processing/data storage means 110; it may store the data retrieved from the sensors in the incorporated memory (not shown) to be later retrieved; or it may be transmitted wirelessly 415; or it may be downloaded to a local or remote computer 410.

While the invention has been described herein with reference to certain examples and embodiments, it will be evident that various modifications and changes may be made to the embodiments described above without departing from the scope and spirit of the invention as set forth in the claims.

What is claimed is:

1. A microfluidic system for performing fluid analysis, comprised of:

a submersible housing having a fluid analysis means and a power supply to provide power to said system; and a substrate for receiving a fluid sample, having embedded therein a fluid sample inlet, a reagent inlet, a fluid sample outlet, and a mixing region in fluid communication with said fluid sample inlet, said reagent inlet, and said fluid sample outlet, and wherein said substrate includes a fluid drive means that is one of a passive fluid drive means or a active fluid drive means for moving the fluid sample through said substrate, and wherein said substrate interconnects with said housing, such that the fluid drive means provides for a pressure-balanced contact with one or more external environment pressure to ensure that at least one reagent is subject to an approximate pressure as the fluid sample, such that the microfluidic system is inherently pressure-balanced as the fluid sample inlet and the fluid sample outlet are exposed to the one or more external environment.

2. The system of claim 1, wherein at least a portion of the fluid analysis means is embedded in said substrate.

3. The system of claim 1, wherein said fluid sample inlet, said reagent inlet, and said fluid sample outlet are connected via channels embedded in the substrate.

4. The system of claim 1, wherein said fluid drive means is a result of the differential pressure between the sampling environment pressure and the pressure of the system.

5. The system of claim 4, wherein the pressure of the system is less than the pressure of the sampling environment.

6. The system of claim 1, wherein said fluid drive means is a pump.

7. The system of claim 6, wherein said pump is embedded in said substrate.

8. The system of claim 7, wherein said pump is a piezoelectric pump.

9. The system of claim 8, wherein said pump is pressure balanced.

10. The system of claim 1, wherein at least one reagent reservoir is connected to said reagent inlet.

11. The system of claim 1, further comprising one or more additional reagent inlets, each additional inlet having at least one reagent reservoir.

12. The system of claim 11, wherein said reagent reservoirs are collapsible bags.

13. The system of claim 11, wherein said reagent reservoirs are threaded.

14. The system of claim 1, further comprising one or more additional fluid analysis means in fluid communication with said substrate.

15. The system of claim 1, further comprising a bubble trap embedded in said substrate and positioned between said mixing region and said fluid analysis means.

16. The system of claim 1, wherein said fluid analysis means is an optical interrogation means.

17. The system of claim 16, wherein said optical interrogation means includes an optical interrogation region that is embedded in said substrate.

18. The system of claim 17, wherein said optical interrogation means includes a light source and a detector.

19. The system of claim 18, wherein optical fibers of said light source and said detector are embedded in said substrate.

20. The system of claim 1, wherein a storage chamber is positioned in fluid communication with said fluid sample outlet.

21. The system of claim 1, wherein said fluid sample inlet and said fluid sample outlet is in fluid communication with the fluid to be sampled.

22. The system of claim 21, further comprising a separator system positioned at said fluid sample outlet.

23. The system of claim 22, wherein said separator system is embedded in said substrate.

24. The system of claim 22, wherein said separator system includes activated charcoal.

25. The system of claim 24, wherein said activated charcoal is embedded in said substrate.

26. The system of claim 22, wherein said separator system includes an ion exchange membrane.

27. The system of claim 26, wherein said ion exchange membrane is embedded in said substrate.

28. The system of claim 1, wherein said substrate is comprised of plastic.

29. The system of claim 1, wherein said substrate is comprise of an optically clear material.

30. The system of claim 1, wherein said substrate is comprised of cyclic olefin copolymer.

31. The system of claim 1, wherein said substrate is manufactured using micro-molding techniques.

32. The system of claim 1, further comprising a control means to control said fluid analysis means.

33. The system of claim 32, wherein said control means further includes data processing means to receive data from said fluid analysis means.

34. The system of claim 33, wherein said processing means further include means to store data.

35. The system of claim 32, wherein said control means further includes data transmission means to transmit data from said fluid analysis means.

36. The system of claim 1, wherein said submersible housing is adapted for connection to a downhole analysis tool.

37. The system of claim 36, wherein said downhole analysis tool is selected from the group consisting of a oilfield characterization tool, a groundwater monitoring tool, or a permanent or semi-permanent monitoring system.

38. A microfluidic device for performing fluid analysis in a subterranean environment, the microfluidic device comprising:

a submersible housing having a fluid analysis means and a power supply to provide power to the microfluidic device; and a substrate for receiving a fluid sample, having embedded therein at least one fluid sample inlet, at least one reagent inlet, at least one fluid sample outlet, and a mixing region in fluid communication with said at least one fluid sample inlet, said at least one reagent inlet, and said at least one fluid sample outlet, and wherein said substrate includes a fluid drive means that is one of a passive fluid drive means or a active fluid drive means for moving the fluid sample through said substrate, and wherein said substrate interconnects with said housing, such that the fluid drive means provides for one of a pumping action that pulls the fluid through the system, a pumping action that pushes the fluid through the system, or some combination thereof;

wherein the microfluidic device is inherently pressure-balanced as the fluid sample inlet and the fluid sample outlet are exposed to one or more external environment.

39. A microfluidic system for performing fluid analysis in a borehole environment, the microfluidic system comprising:

a submersible housing having a fluid analysis means and a power supply to provide power to said system; and a substrate for receiving a fluid sample, having embedded therein a fluid sample inlet, a reagent inlet, a fluid sample outlet, and a mixing region in fluid communication with said fluid sample inlet, said reagent inlet, and said fluid sample outlet, and wherein said substrate includes a fluid drive means that is one of a passive fluid drive means or a active fluid drive means for moving the fluid sample through said substrate, and wherein said substrate interconnects with said housing; and at least one reagent reservoir having a pressure-balanced contact with at least one pressure environment to ensure that a reagent is subject to an approximate pressure as the fluid sample;

wherein the microfluidic system is inherently pressure-balanced as the fluid sample inlet and the fluid sample outlet are exposed to one or more external environment.

* * * * *